United States Patent
Tang et al.

(10) Patent No.: US 12,524,940 B2
(45) Date of Patent: Jan. 13, 2026

(54) METHOD, APPARATUS, DEVICE AND STORAGE MEDIUM FOR VIDEO GENERATION

(71) Applicant: Beijing Zitiao Network Technology Co., Ltd., Beijing (CN)

(72) Inventors: Aini Tang, Beijing (CN); Tianqi Zhang, Beijing (CN); Qizhi Zhang, Beijing (CN); Huimin Zhou, Beijing (CN); Hanqi Zheng, Beijing (CN); Haohua Zhong, Beijing (CN); Haoran Zhang, Beijing (CN); Gen Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/622,479

(22) Filed: Mar. 29, 2024

(65) Prior Publication Data

US 2024/0355024 A1    Oct. 24, 2024

Related U.S. Application Data

(63) Continuation of application No. PCT/CN2023/136857, filed on Dec. 6, 2023.

(30) Foreign Application Priority Data

Apr. 23, 2023  (CN) .......................... 202310446304.X

(51) Int. Cl.
*G06T 11/60* (2006.01)
*G11B 27/031* (2006.01)

(52) U.S. Cl.
CPC ............ *G06T 11/60* (2013.01); *G11B 27/031* (2013.01)

(58) Field of Classification Search
None
See application file for complete search history.

(56) References Cited

U.S. PATENT DOCUMENTS 10,049,477 B1 * 8/2018 Kokemohr ............ G06T 11/001
2007/0083851 A1   4/2007 Huang et al.
(Continued)

FOREIGN PATENT DOCUMENTS

CN    110996017 A        4/2020
CN    112579826 A  *  3/2021  ......... G06F 16/7867
(Continued)

OTHER PUBLICATIONS

Unschooler, "Meitu Video Editing Tutorial", downloaded @https://www.youtube.com/watch?v=6VUoS7AUjEs, uploaded on Jun. 30, 2020) (Year: 2020).*

(Continued)

*Primary Examiner* — Yingchun He
(74) *Attorney, Agent, or Firm* — BakerHostetler

(57) ABSTRACT

The disclosure provides a method, an apparatus, a device and a storage medium for video generation. The method comprises: obtaining first text information used to describe a video effect requirement; obtaining at least one multimedia material; and generating a target video based on the first text information and the at least one multimedia material. The at least one multimedia material is presented in the target video. A video effect of the target video meets the video effect requirement described in the first text information. The target video is used to present a combination of at least one video segment. The at least one video segment is formed respectively based on respective video-image materials in the at least one multimedia material. The respective video-image materials comprise a video material and/or an image material.

20 Claims, 7 Drawing Sheets

(56) References Cited

U.S. PATENT DOCUMENTS

| | | | |
|---|---|---|---|
| 2018/0096708 A1 | 4/2018 | Choi et al. | |
| 2019/0295532 A1* | 9/2019 | Ammedick | G10L 15/22 |
| 2020/0411053 A1* | 12/2020 | Han | G11B 27/34 |
| 2022/0188352 A1 | 6/2022 | Wu | |
| 2023/0162502 A1* | 5/2023 | Patel | G06F 18/23 |
| | | | 382/103 |
| 2023/0282240 A1* | 9/2023 | Wiersema | G11B 27/034 |
| | | | 386/278 |
| 2024/0107127 A1 | 3/2024 | Chen et al. | |

FOREIGN PATENT DOCUMENTS

| | | |
|---|---|---|
| CN | 112637675 A | 4/2021 |
| CN | 113518160 A | 10/2021 |
| CN | 115442539 A | 12/2022 |
| WO | WO 2022/088783 A1 | 5/2022 |

OTHER PUBLICATIONS

Stackoverflow forum, downloaded @https://stackoverflow.com/questions/43575859/any-way-to-use-image-with-select-list, available online on Apr. 23, 2017 (Year: 2017).*

Xiohoo, Xiohoo Quick Tips—Video Editing on Meitu: Transitions Tool, downloaded @ Xiohoo Quick Tips—Video Editing on Meitu: TransitionsTool (Year: 2023).*

International Patent Application No. PCT/CN2023/136857; Int'l Search Report; dated Feb. 27, 2024; 2 pages.

European Patent Application No. 23866709.1; Extended Search Report; dated Jan. 17, 2025; 10 pages.

* cited by examiner

METHOD, APPARATUS, DEVICE AND STORAGE MEDIUM FOR VIDEO GENERATION

CROSS-REFERENCE

This application is a continuation of International Patent Application No. PCT/CN2023/136857, filed on Dec. 6, 2023, which claims priority to Chinese Patent Application No. 202310446304.X filed on Apr. 23, 2023, both of which are herein incorporated by reference in their entireties.

FIELD

The present disclosure relates to the field of data processing, and more particularly to a method, an apparatus, a device, and a storage medium for video generation.

BACKGROUND

With the continuous development of video processing technology, users have increasingly diverse requirements for the video generation manner. Therefore, how to enrich the video generation manner to meet diverse video generation requirements of users and improve user experience is currently an urgent technical problem that needs to be solved.

SUMMARY

In order to solve the above technical problem, a method, an apparatus, a device, and a storage medium for video generation are provided in the present disclosure, which may enrich video generation manner and improve user experience.

In a first aspect, a method of video generation is provided in the present disclosure, and the method comprises:
 obtaining first text information, wherein the first text information is used to describe a video effect requirement;
 obtaining at least one multimedia material; and
 generating a target video based on the first text information and the at least one multimedia material, wherein the at least one multimedia material is presented in the target video, a video effect of the target video meets the video effect requirement described in the first text information, the target video is used to present a combination of at least one video segment, the at least one video segment is formed respectively based on respective video-image materials in the at least one multimedia material, and the respective video-image materials comprise a video material and/or an image material.

In an alternative implementation, the generating a target video based on the first text information and the at least one multimedia material comprises:
 generating a video editing draft based on the first text information and the at least one multimedia material, wherein the video editing draft comprises the at least one multimedia material and editing information, the editing information is used to indicate an editing operation for the at least one multimedia material, and the editing operation is at least used to edit the respective video-image materials in the at least one multimedia material respectively into the at least one video segment; a video editing effect and/or the at least one multimedia material corresponding to the editing operation meet the video effect requirement described in the first text information; and
 generating the target video based on the video editing draft.

In an alternative implementation, the generating a video editing draft based on the first text information and the at least one multimedia material comprises:
 determining at least one video editing template based on the first text information and the at least one multimedia material, wherein the editing effect of the at least one video editing template meets the video effect requirement described in the first text information; and
 applying an editing operation indicated by a target video editing template from the at least one video editing template to the at least one multimedia material, to generate the video editing draft.

In an alternative implementation, the determining at least one video editing template based on the first text information and the at least one multimedia material comprises:
 extracting feature labels for the first text information and the at least one multimedia material respectively; and
 obtaining the at least one video editing template based on matching the feature labels for the first text information and the at least one multimedia material with an available video editing template, the at least one video editing template comprising a first video editing template that matches the feature label for the first text information and a second video editing template that matches the feature label for the at least one multimedia material.

In an alternative implementation, the obtaining at least one multimedia material comprises:
 determining a matching out a matching first multimedia material from the at least one multimedia material from a user material set, based on an analysis result for the first text information; and/or,
 generating a second multimedia material from the at least one multimedia material based on the analysis result for the first text information, wherein the at least one multimedia material meets the video effect requirement described in the first text information.

In an alternative implementation, before the obtaining first text information, the method further comprises:
 displaying a text input box, in response to an importing operation for the at least one multimedia material; and
 wherein the obtaining first text information comprises:
 receiving first text information based on the text input box.

In an alternative implementation, before the receiving first text information based on the text inputting box, the method further comprises:
 displaying at least one video label, wherein the video label is used to characterize the video effect; and
 wherein the receiving first text information based on the text inputting box comprises:
 obtaining the first text information based on an operation of adding a target video label in the at least one video labels to the text input box.

In an alternative implementation, after the determining at least one video editing template based on the first text information and the at least one multimedia material, the method further comprises:
 selecting a third video editing template from the at least one video editing template and presenting the third video editing template on a preview page for a video editing effect, so that the preview page is used to preview the video effect obtained by importing the at least one multimedia material into the third video editing template, and the preview page being configured with an update recommendation control; and in response to a trigger operation for the update recommendation control, selecting a fourth video editing template in the at least one video editing template, and replacing the third video editing template presented on the preview page with the fourth video editing template, so that the preview page is used to preview the video effect obtained by importing the at least one multimedia material into the fourth video editing template.

In an alternative implementation, after the determining at least one video editing template based on the first text information and the at least one multimedia material, the method further comprises:

displaying, on a preview page, a fifth video editing template in the at least one video editing template;

obtaining adjusted text information, in response to a text adjustment operation on the preview page for the first text information;

determining a second video editing template set based on the adjusted text information and the at least one multimedia material; and replacing the fifth video editing template displayed on the preview page with a sixth video editing template in the second video editing template set.

In an alternative implementation, before the determining a second video editing template set based on the adjusted text information and the at least one multimedia material, the method further comprises:

receiving a material adjustment operation for the at least one multimedia material to obtain an adjusted multimedia material; and wherein the determining a second video editing template set based on the adjusted text information and the at least one multimedia material comprises:

determining the second video editing template set based on the adjusted text information and the adjusted multimedia material.

In a second aspect, an apparatus for video generation is provided in the present disclosure, and the apparatus comprises:

a first obtaining module configured to obtain first text information, wherein the first text information is used to describe a video effect requirement;

a second obtaining module configured to obtain at least one multimedia material; and a generating module configured to generate a target video based on the first text information and the at least one multimedia material, wherein the at least one multimedia material is presented in the target video, a video effect of the target video meets the video effect requirement described in the first text information, the target video is used to present a combination of at least one video segment, the at least one video segment is formed respectively based on respective video-image materials in the at least one multimedia material, and the respective video-image materials comprise a video material and/or an image material.

In a third aspect, a computer-readable storage medium is provided in the present disclosure, and the computer-readable storage medium stores an instruction that, when executed on a terminal device, causes the terminal device to implement the method mentioned above.

In a fourth aspect, a device for video processing is provided in the present disclosure. The device for video processing comprises: a memory, a processor, and a computer program stored in the memory and executable on the processor, the computer program, when executed by the processor, implements the method mentioned above.

In a fifth aspect, a computer program product is provided in the present disclosure. The computer program product comprises a computer program/an instruction, and the computer program/the instruction, when executed by a processor, implements the method mentioned above.

The embodiments of the present disclosure have at least the following advantages over the prior art:

The embodiments of the present disclosure provide a method of video generation. Specifically, first text information used to describe a video effect requirement is obtained, and at least one multimedia material is obtained; a target video is generated based on the first text information and the at least one multimedia material; the at least one multimedia material is presented in the target video, a video effect of the target video meets the video effect requirement described in the first text information, the target video is used to present a combination of at least one video segment, the at least one video segment is formed respectively based on respective video-image materials in the at least one multimedia material, and the respective video-image materials comprise a video material and/or an image material. It may be seen that, in the embodiments of the present disclosure, the target video that meets the video effect requirement described in the first text information may be generated based on the obtained first text information and multimedia material, enriching the video generation manner and improving the user experience.

BRIEF DESCRIPTION OF THE DRAWINGS

The drawings herein are incorporated in and constitute a part of this specification, illustrate the embodiments of the present disclosure, and together with the description serve to explain the principles of the present disclosure.

In order to more clearly illustrate the technical solutions in the embodiments of the present disclosure or the prior art, the drawings required for the description of the embodiments or the prior art will be briefly introduced below. Obviously, for those of ordinary skill in the art, without creative effort, other drawings may also be obtained based on these drawings.

DETAILED DESCRIPTION

In order to better understand the above objects, features, and advantages of the present disclosure, the following will further describe solutions of the present disclosure. It should be noted that, without conflict, the embodiments of the present disclosure and the features in the embodiments may be combined with each other.

Many specific details are set forth in the following description in order to make the present disclosure fully understandable, but the present disclosure may also be implemented in other ways different from those described herein; obviously, the embodiments in the specification are only part of the embodiments of the present disclosure, not all embodiments.

With the continuous development of video processing technology, users have increasingly diverse requirements for the video generation manner. Therefore, the embodiments of the present disclosure provide a method of video generation that may generate the target video that meets the requirement of the video effect by analyzing the text information describing the video effect requirement, enriching the video generation manner and improving the user experience.

Specifically, in the method of video generation provided in the embodiments of the present disclosure, first text information used to describe a video effect requirement is obtained, and at least one multimedia material is obtained; a target video is generated based on the first text information and the at least one multimedia material; the at least one multimedia material is presented in the target video, a video effect of the target video meets the video effect requirement described in the first text information, the target video is used to present a combination of at least one video segment, the at least one video segment is formed respectively based on respective video-image materials in the at least one multimedia material, and the respective video-image materials comprise a video material and/or an image material. It may be seen that, in the embodiments of the present disclosure, the target video that meets the video effect requirement described in the first text information may be generated based on the obtained first text information and multimedia material, enriching the video generation manner and improving the user experience.

Figure 1:
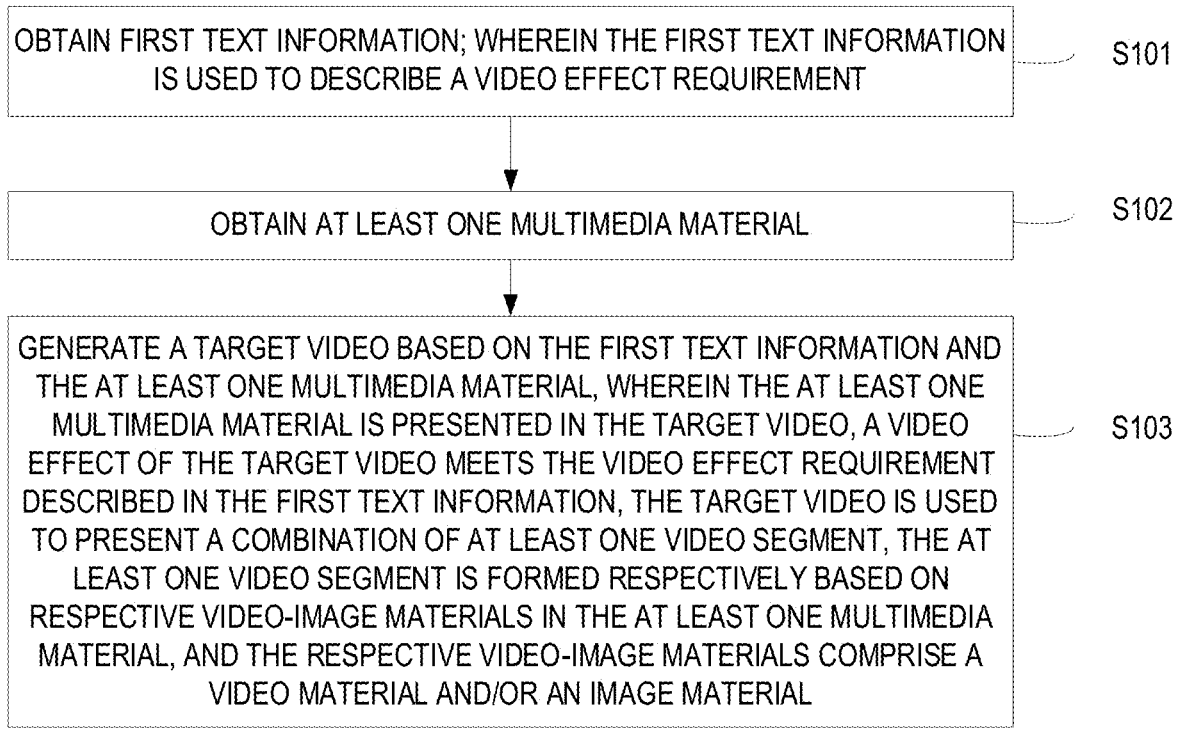
FIG. 1 is a flowchart of a method of video generation provided in the embodiments of the present disclosure.

Based on this, the embodiments of the present disclosure provide a method of video generation. Referring to FIG. 1, which is a flowchart of a method of video generation is provided in the embodiments of the present disclosure, the method comprises:

S101: obtaining first text information.

The first text information is used to describe a video effect requirement.

In the embodiments of the present disclosure, the first text information may be text information input by a user. In particular, the input manner of the text information is not limited, the first text information, for example, may be input by a voice input manner, may be input based on a keyboard input manner, or may further be input by a way of importing text information.

The first text information is the text information that may describe the video effect requirement. Alternatively, the video effect requirement described in the first text information may be a requirement for a video style type, such as the first text information may be "comic style". The video effect requirement described in the first text information may further be a requirement for a video display content, such as the first text information may be "warm summer, warm afternoon". The embodiments of the present disclosure do not specifically limit the video effect requirement described in the first text information.

S102: obtain at least one multimedia material.

In the embodiments of the present disclosure, before generating the target video, it is necessary to obtain the multimedia material. The multimedia material may include a pictures, a video, an audio, or the like.

Figure 2:
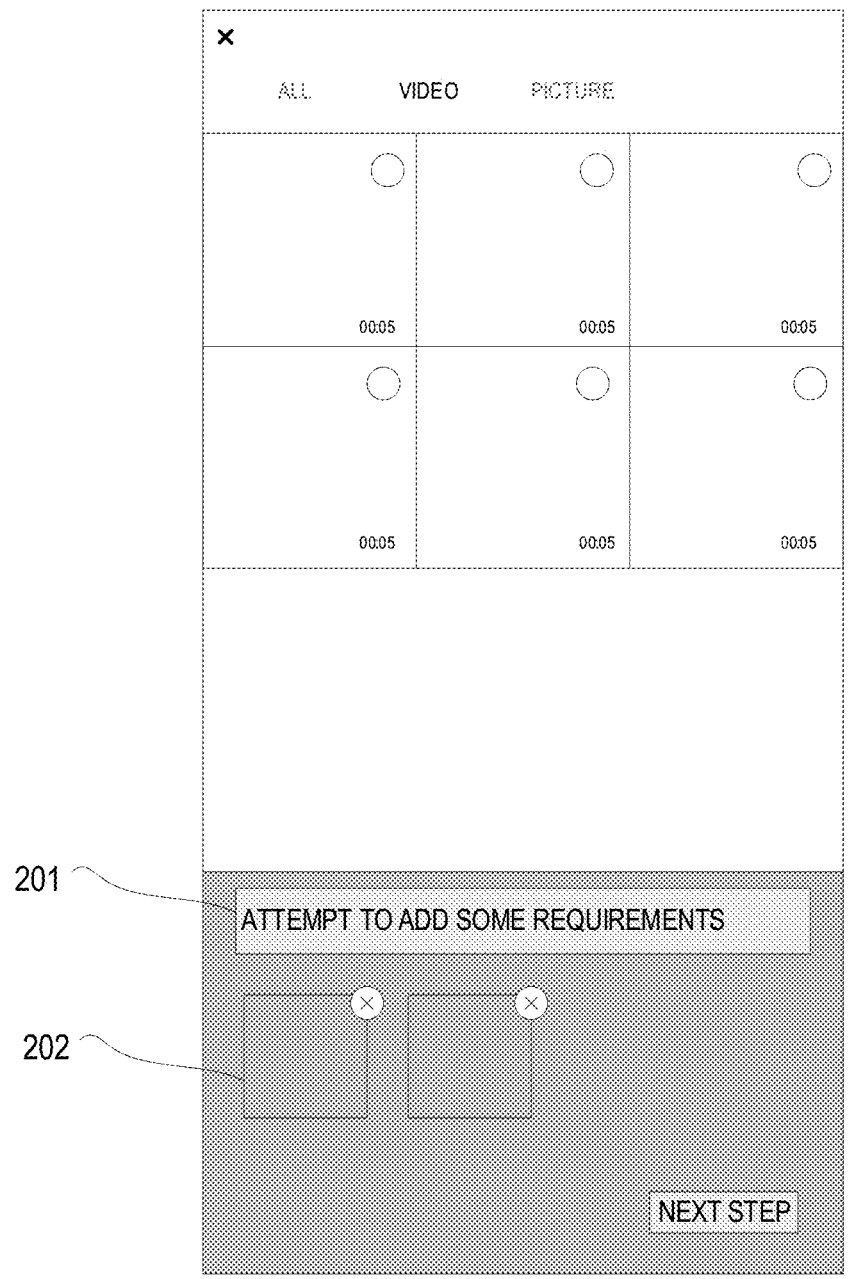
FIG. 2 is a schematic diagram of a material selection page provided in the embodiments of the present disclosure.

In an alternative implementation, the multimedia material may be obtained by a user import manner. As shown in FIG. 2, which is a schematic diagram of a material selection page provided in the embodiments of the present disclosure. Respective multimedia material in a user material set is displayed on the material selection page. In response to receiving an import operation for at least one multimedia material, at least one imported multimedia material is obtained. In addition, in response to receiving the import operation for the at least one multimedia material, a text input box may further be triggered to be displayed. As shown in FIG. 2, after importing a multimedia material 202, a text input box 201 is displayed on the material selection page. The first text information may be input in the text input box 201 to obtain the first text information.

Figure 3:
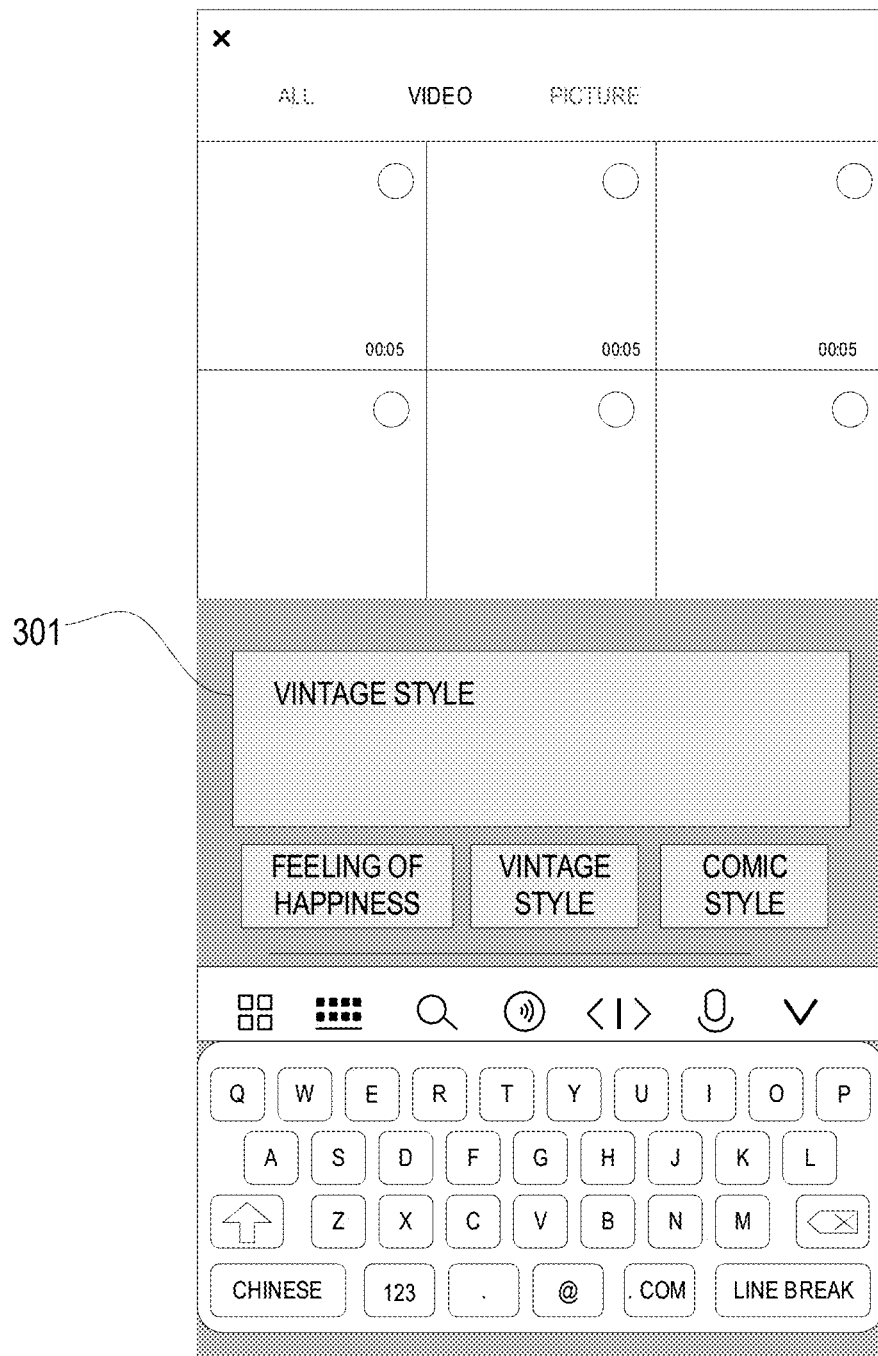
FIG. 3 is a schematic diagram of a further material selection page provided in the embodiments of the present disclosure.

In addition, while displaying the text input box on the material selection page, at least one video label may further be displayed. As shown in FIG. 3, there are multiple video labels displayed below a text input box 301, such as a video label of "comic style". By selecting a target video label from the displayed video labels, the target video label is triggered to be added to the text input box 301 to obtain the first text information. The target video label added to the text input box 301 may include one or more video labels displayed on the material selection page.

Specifically, the first text information may only include the target video label, or may only include the text information input by the user, and may further include the target video label and the text information input by the user.

In a further alternative implementation, the at least one multimedia material may be obtained based on the analysis of the first text information. Alternatively, the at least one multimedia material may be matched out from the user material set based on an analysis result for the first text information. Specifically, the first text information is semantically analyzed by a natural language analysis algorithm, and the at least one multimedia material is matched out from the user material set based on the analysis result, which is subsequently used to generate a target video.

In addition, the at least one multimedia material may be generated based on the analysis result of the first text information. Specifically, the first text information is semantically analyzed by a natural language analysis algorithm, and the multimedia materials, such as an image, a video segment, an audio, or the like, are generated based on the analysis result, which are subsequently used to generate the target video.

In the embodiments of the present disclosure, the multimedia material matched out from the user material set, and the generated multimedia material based on the analysis result of the first text information, are consistent with the video effect requirement described in the first text information.

S103: generate a Target Video Based on the First Text Information and the at Least One multimedia material.

The at least one multimedia material is presented in the target video, a video effect of the target video meets the video effect requirement described in the first text information, the target video is used to present a combination of at least one video segment, the at least one video segment is formed respectively based on respective video-image materials in the at least one multimedia material, and the respective video-image materials comprise a video material and/or an image material.

In the embodiments of the present disclosure, after obtaining the first text information and the at least one multimedia material, the target video is generated using the first text information and the at least one multimedia material.

In the method of video generation provided in the embodiments of the present disclosure, first text information used to describe a video effect requirement is obtained, and at least one multimedia material is obtained; a target video is generated based on the first text information and the at least one multimedia material; the at least one multimedia material is presented in the target video, a video effect of the target video meets the video effect requirement described in the first text information, the target video is used to present a combination of at least one video segment, the at least one video segment is formed respectively based on respective video-image materials in the at least one multimedia material, and the respective video-image materials comprise a video material and/or an image material. It may be seen that, in the embodiments of the present disclosure, the target video that meets the video effect requirement described in the first text information may be generated based on the obtained first text information and multimedia material, enriching the video generation manner and improving the user experience.

Figure 4:
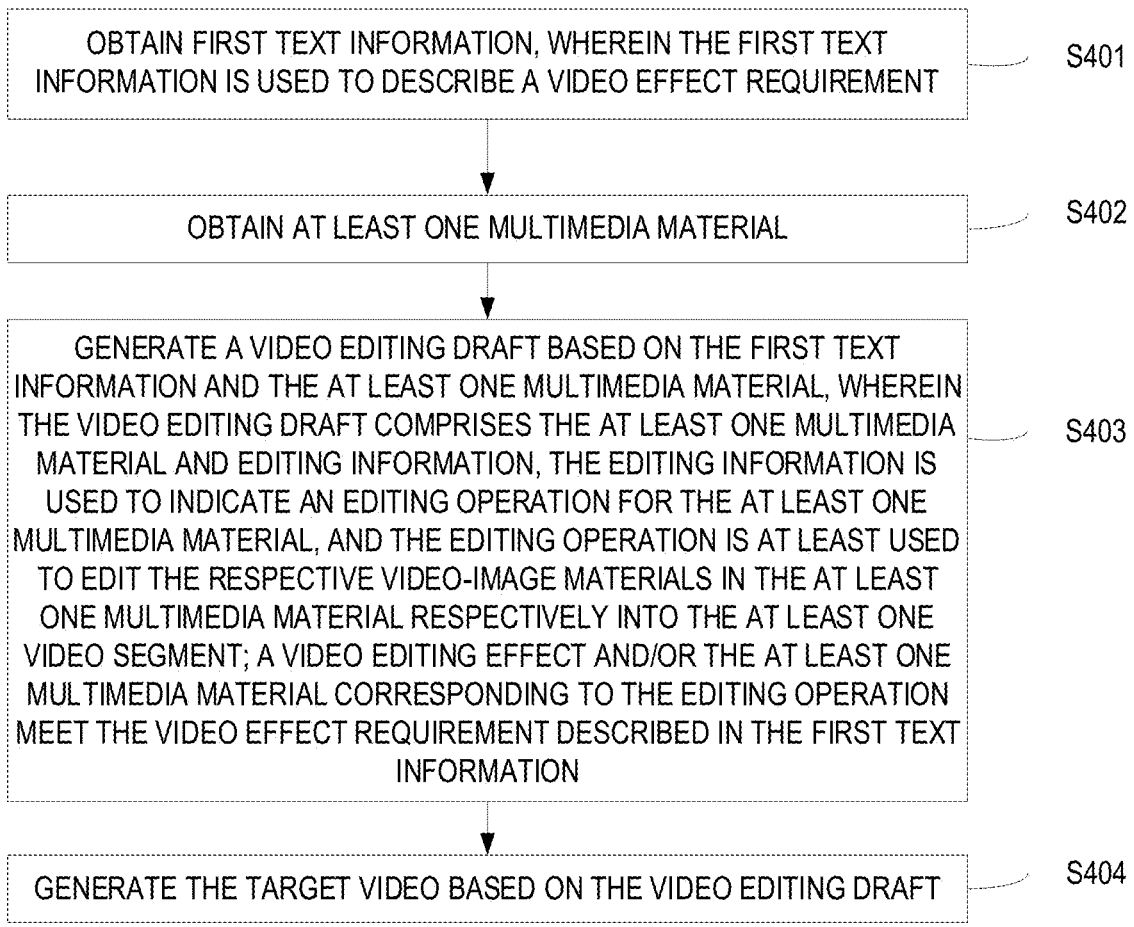
FIG. 4 is a flowchart of a further method of video generation provided in the embodiments of the present disclosure.

On the basis of the above embodiments, the embodiments of the present disclosure further provide a method of video generation. Referring to FIG. 4, which is a flowchart of a further method of video generation provided in the embodiments of the present disclosure, the method of video generation comprises:

S401: obtaining first text information, wherein the first text information is used to describe a video effect requirement.

S402: obtain at least one multimedia material.

In the embodiments of the present disclosure, the way to obtain the first text information and the at least one multimedia material may be understood with reference to the above embodiments, which is not described here again.

S403: generate a video editing draft based on the first text information and the at least one multimedia material.

The video editing draft comprises the at least one multimedia material and editing information, the editing information is used to indicate an editing operation for the at least one multimedia material, and the editing operation is at least used to edit the respective video-image materials in the at least one multimedia material respectively into the at least one video segment; a video editing effect and/or the at least one multimedia material corresponding to the editing operation meet the video effect requirement described in the first text information.

In the embodiments of the present disclosure, after obtaining the first text information and the at least one multimedia material, the video editing draft is generated based on the analysis of the first text information, or a comprehensive analysis of the first text information and the at least one multimedia material.

The video editing draft comprises the obtained at least one multimedia material and editing information. The editing information is used to indicate an editing operation for the at least one multimedia material. The editing operation is at least used to edit the respective video-image materials in the at least one multimedia material into the at least one video segment, and one video segment may comprise one video-image material or a combination of a plurality of video-image material. The video editing effect corresponding to the editing operation meets the video effect requirement described in the first text information, and the multimedia material in the video editing draft also meets the video effect requirement described in the first text information.

In an alternative implementation, the editing information included in the video editing draft may be used to indicate the editing operation determined based on the analysis of the first text information. For example, if the first text information is "warm summer, warm afternoon", the editing operation indicated by the editing information including adding a filter A to one or more video segments may be determined by the analysis of the first text information.

In a further alternative implementation, the editing information included in the video editing draft may be used to indicate the editing operation determined based on the analysis of a user-imported multimedia material. For example, if the user-imported multimedia material includes a summer vacation picture, a video segment, or the like, the editing operation indicated by the editing information including adding a filter B to one or more video segments may be determined by the analysis of the user-imported multimedia material.

Comprehensive of the above two embodiments, the editing information included in the video editing draft may be used to indicate the editing operation, which may include the editing operation determined based on analyzing the first text information and the user-imported multimedia material. Specific implementations may be referred to the two embodiments described above, which will not be repeated here.

In a further alternative implementation, the editing information included in the video editing draft may be used to indicate the editing operation, which includes the editing operation indicated by a target video editing template. The editing operation indicated by the target video editing template is used to edit the obtained multimedia material. The target video editing template may be a user-selected video editing template or a video editing template determined based on the analysis of the first text information. The content related to the target video editing template will be described in detail in subsequent embodiments.

S404: generate the target video based on the video editing draft.

In the embodiments of the present disclosure, after generating the video editing draft based on the obtained first text information and multimedia material, the editing operation may be further performed on the video editing draft, for example, adjusting all or part of the editing information in the video editing draft, or the like.

In an alternative implementation, the video editing draft is displayed on a preview page, and the target video is generated based on the video editing draft in response to an exporting operation for the video editing operation. The video effect of the exported target video meets the video effect requirement described in the first text information.

In the method of video generation provided in the embodiments of the present disclosure, after obtaining the first text information describing the video effect requirement, and multimedia material, a video editing draft is generated based on the first text information and the multimedia material. Then, a target video meeting the video effect requirement described in the first text information is generated based on the video editing draft. It may be seen that, in the embodiments of the present disclosure, a video editing operation is generated based on the first text information and the multimedia material, and then the target video meeting the video effect requirement described in the first text information is generated based on the video editing draft, enriching the video generation manner and improving the user experience.

Figure 5:
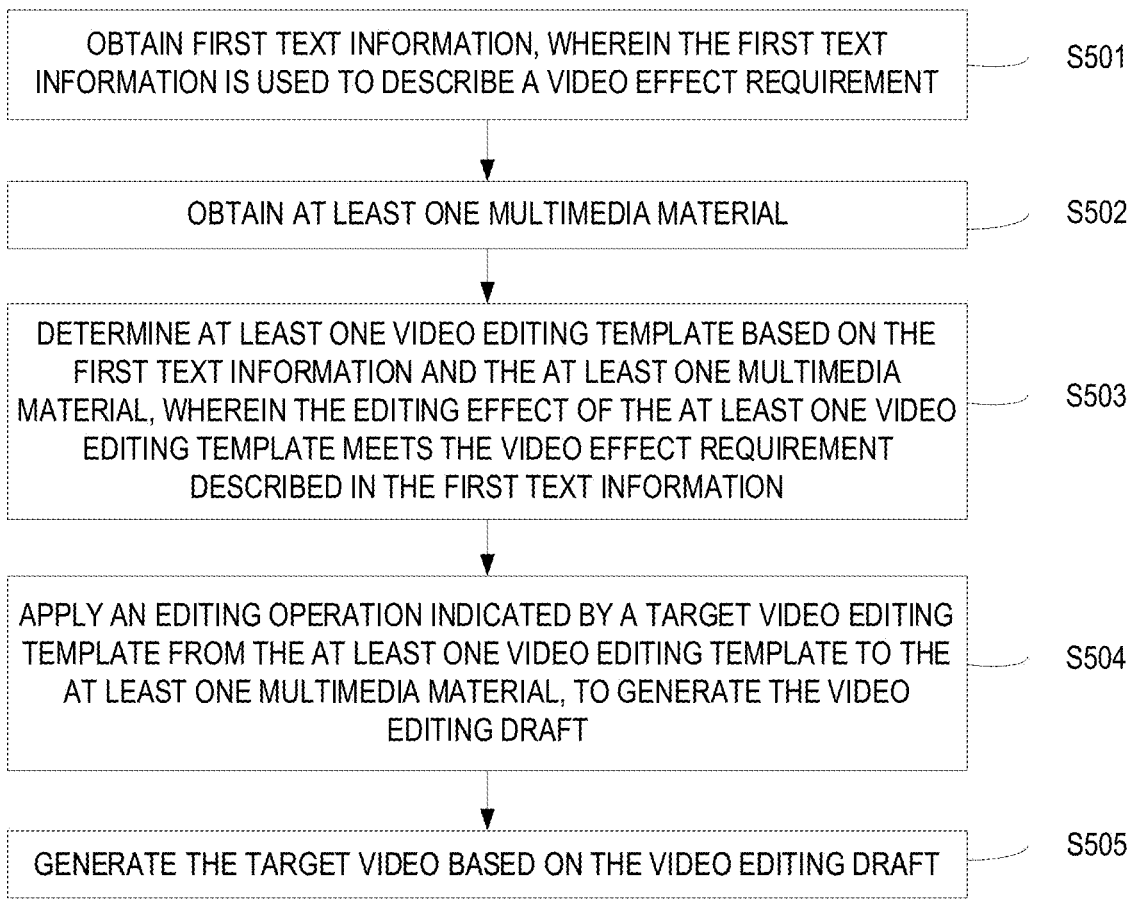
FIG. 5 is a flowchart of a further method of video generation provided in the embodiments of the present disclosure.

On the basis of the above embodiments, the embodiments of the present disclosure further provide a method of video generation. Referring to FIG. 5, which is a flowchart of a further method of video generation provided in the embodiments of the present disclosure, the method of video generation comprises:

S501: obtaining first text information, wherein the first text information is used to describe a video effect requirement;

S502: obtaining at least one multimedia material.

In the embodiments of the present disclosure, the way to obtain the first text information and the at least one multimedia material may still be understood with reference to the above embodiments, which will not be described here again.

S503: determine at least one video editing template based on the first text information and the at least one multimedia material.

The editing effect of the at least one video editing template meets the video effect requirement described in the first text information.

In an alternative embodiment, after obtaining the first text information and the multimedia material, feature labels for the first text information and the multimedia material are extracted respectively. Then, the at least one video editing template is obtained based on matching the feature labels for the first text information and the at least one multimedia material with an available video editing template. The at least one video editing template comprises a first video editing template that matches the feature label for the first text information and a second video editing template that matches the feature label for the at least one multimedia material.

In an alternative embodiment, the feature labels corresponding to the first text information and the multimedia material respectively are matched with an available video editing template in a template library to obtain at least one video editing template that matches successfully. The editing effect of the video editing template that matches successfully meets the video effect requirement described in the first text information.

Further, after obtaining the video editing template matching the feature label for the first text information, and the video editing template matching the feature label for the multimedia material, the video editing templates corresponding to the two are mixed and arranged respectively, and the video editing template after mixing and arranging may be displayed on the preview page.

Figure 6:
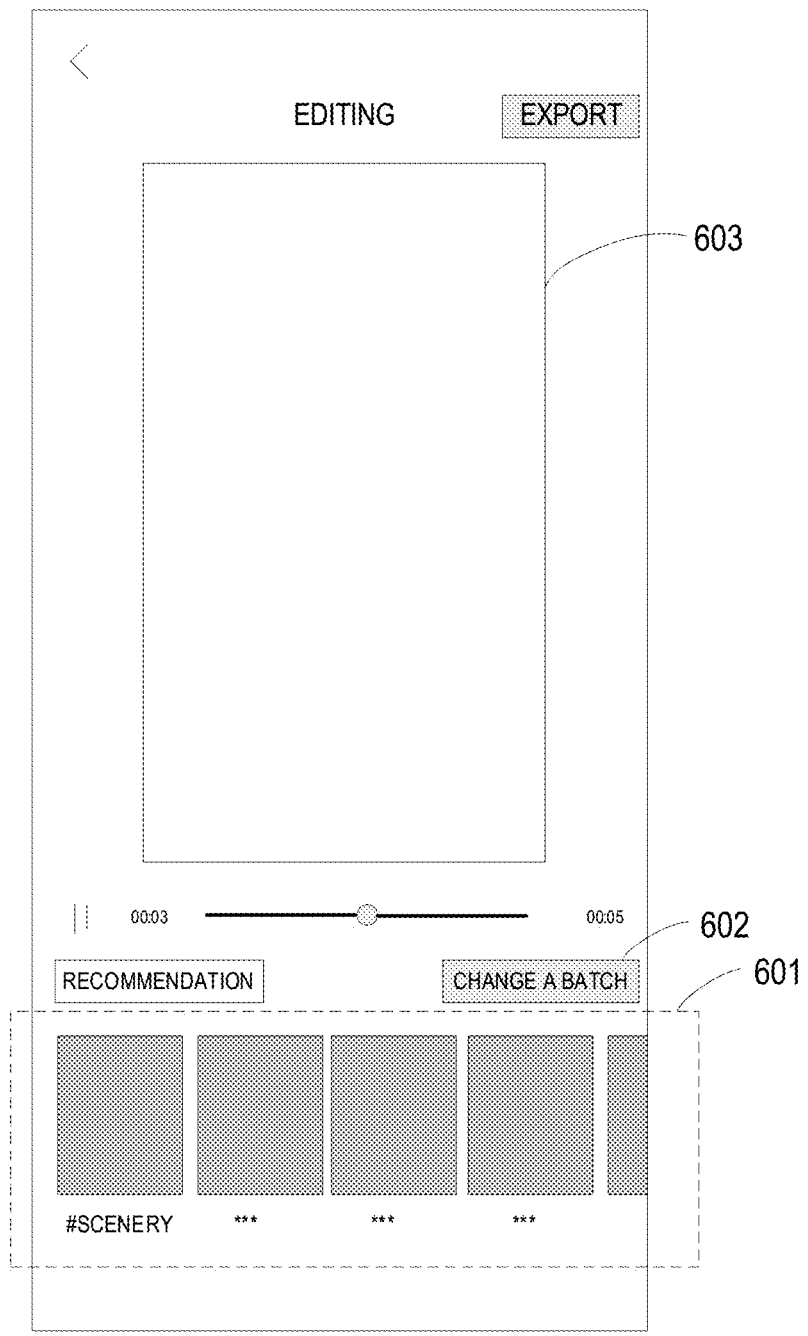
FIG. 6 is a schematic diagram of a preview page provided in the embodiments of the present disclosure.

As shown in FIG. 6, which is a schematic diagram of a preview page provided in the embodiments of the present disclosure. A lower area 601 of the preview page displays a predetermined number of video editing templates, and the predetermined number of video editing templates is determined based on the obtained first text information and the at least one multimedia material. A user may trigger more video editing templates to be displayed on the preview page by a lateral sliding operation in the lower area 601, such as more video editing templates may be displayed from pulling out the right side of the preview page by the lateral sliding operation to the left. The video editing template displayed from pulling out is also determined based on the obtained first text information and the at least one multimedia material.

In an alternative embodiment, a third video editing template is selected from the obtained at least one video editing template and the third video editing template is presented on a preview page for the video editing effect, so that the preview page is used to preview the video effect obtained by importing the at least one multimedia material into the third video editing template. The preview page is configured with an update recommendation control. The third video editing template may be any selected video editing template displayed on the preview page.

In response to a trigger operation for the update recommendation control, a fourth video editing template is selected in the at least one video editing template, and the third video editing template presented on the preview page is replaced with the fourth video editing template, so that the preview page is used to preview the video effect obtained by importing the at least one multimedia material into the fourth video editing template. The fourth video editing template for replacing the third video editing template may belong to the at least one video editing template determined based on the first text information and the obtained at least one multimedia material.

In an alternative implementation, if the video editing template displayed on the preview page does not meet the use requirement of the current user for the video editing template, the current user may trigger an update of the display of the video editing template displayed on the preview page by the trigger operation on a "change a batch" control 602 set on the preview page.

Specifically, the first video editing template in a first video editing template set is displayed on the preview page. The first video editing template set is composed of at least one video editing template determined based on the first text information and the at least one multimedia material. The predetermined number of the video editing templates in the first video editing template set are displayed on the preview page, as shown in FIG. 6, the predetermined number of the video editing templates are displayed in the lower area 601 of the preview page, which includes the first video editing template. The first video editing template may be any video editing template displayed on the preview page. In response to the trigger operation on the update recommendation control (such as the "change a batch" control 602 shown in FIG. 6) on the preview page, the second video editing template in the first video editing template set is used to replace the first video editing template displayed on the preview page. That is to say, in response to the trigger operation on the update recommendation control on the preview page, the predetermined number of video editing templates in the first video editing template set are used to replace the video editing template being displayed on the preview page, and the update of the video editing template is realized, so that the user may generate the target video based on the updated video editing template displayed on the preview page.

S504: apply an editing operation indicated by a target video editing template from the at least one video editing template to the at least one multimedia material, to generate the video editing draft.

In the embodiments of the present disclosure, in response to a selecting operation on the target video editing template for at least one video editing template displayed on the preview page, the editing operation of the target video editing template is applied to the obtained multimedia material, and the video editing operation is generated.

In practical applications, the user may further trigger the switching operation for the video editing template. Specifically, preview effect of the video editing draft that applied any video editing template (such as a video editing template A) is displayed within a preview window 603 on the preview page. The user may trigger the preview effect of the video editing draft that applied a video editing template B displaying within the preview window 603 by the selecting operation for other video editing templates (such as the video editing template B).

In a further alternative implementation, on the preview page, the user may further adjust the first text information based on the preview effect of the video editing draft, to generate the video editing draft that meets the video effect requirement of the user.

Specifically, the video editing template determined based on an initial first text information and the multimedia material is displayed on the preview page. Upon receiving a text adjustment operation for the initial first text information, the adjusted text information is obtained. Then, based on the adjusted text information and the multimedia material, the video editing template that meets the video effect requirement described in the adjusted text information is re-determined. The user may generate the video editing draft that meets the video effect requirement described in the adjusted text information based on the re-determined video editing template.

In an alternative implementation, a fifth video editing template in the at least one video editing template is displayed on the preview page; the fifth video editing template is any of the video editing templates determined based on the first text information and the multimedia material. The adjusted text information is obtained, in response to the text adjustment operation on the preview page for the first text information; then, a second video editing template set is determined based on the adjusted text information and the multimedia material; and the fifth video editing template displayed on the preview page is replaced with a sixth video editing template in the second video editing template set. The sixth video editing template is any of the video editing templates re-determined based on the adjusted text information and the multimedia material.

On the basis of the above content, on the preview page, the user may not only adjust the first text information, but also adjust the multimedia material based on the preview effect of the video editing draft, in order to generate the video editing draft that meets the video effect requirement of the user.

In an alternative implementation, a material adjustment operation for the initial multimedia material is received to obtain an adjusted multimedia material; the adjusted multimedia material may include all or part of the multimedia material in the initial multimedia material, and the material adjustment operation may include an operation such as material adding, deleting, replacing, or the like, for the initial multimedia material. Based on the adjusted text information and the adjusted multimedia material, the second video editing template set is determined. The video editing template in the second video editing template set is re-determined based on the first text information (or the adjusted text information) and the adjusted multimedia material.

S505: generate the target video based on the video editing draft.

In the embodiments of the present disclosure, after generating the video editing draft, the target video may be generated by triggering an exporting operation for the video editing draft. In addition, the generated target video may be saved to the local or the cloud, or a posting operation may be triggered for the target video.

In the method of video generation provided in the embodiments of the present disclosure, based on the text information and the multimedia material describing the video effect requirement, the video editing template that meets the video effect requirement is determined, and then the target video is generated based on the video editing template, enriching the video generation manner, thereby improving the user experience.

Figure 7:
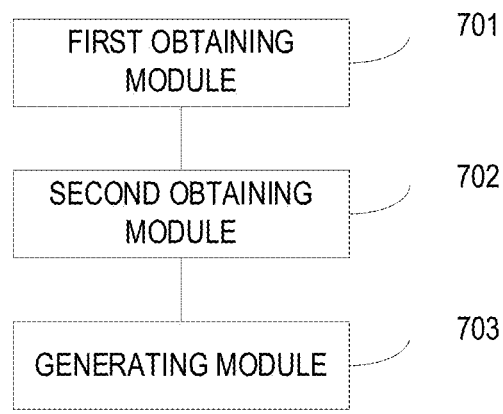
FIG. 7 is a schematic structural diagram of an apparatus for video generation provided in the embodiments of the present disclosure.

On the basis of the above method embodiments, the present disclosure further provides an apparatus for video generation. With reference to FIG. 7, which is a schematic structural diagram of an apparatus for video generation based on the embodiments of the present disclosure, the apparatus comprises:

a first obtaining module 701 configured to obtain first text information; the first text information is used to describe a video effect requirement;

a second obtaining module configured to obtain at least one multimedia material; and a generating module configured to generate a target video based on the first text information and the at least one multimedia material, wherein the at least one multimedia material is presented in the target video, a video effect of the target video meets the video effect requirement described in the first text information, the target video is used to present a combination of at least one video segment, the at least one video segment is formed respectively based on respective video-image materials in the at least one multimedia material, and the respective video-image materials comprise a video material and/or an image material.

In an alternative implementation, the generating module comprises:

a first generating sub-module configured to generate a video editing draft based on the first text information and the at least one multimedia material, wherein the video editing draft comprises the at least one multimedia material and editing information, the editing information is used to indicate an editing operation for the at least one multimedia material, and the editing operation is at least used to edit the respective video-image materials in the at least one multimedia material respectively into the at least one video segment; a video editing effect and/or the at least one multimedia material corresponding to the editing operation meet the video effect requirement described in the first text information; and a second generating sub-module configured to generate the target video based on the video editing draft.

In an alternative implementation, the second generating sub-module comprises:

a first determining sub-module configured to determine at least one video editing template based on the first text information and the at least one multimedia material, wherein the editing effect of the at least one video editing template meets the video effect requirement described in the first text information; and a third generating sub-module configured to apply an editing operation indicated by a target video editing template from the at least one video editing template to the at least one multimedia material, to generate the video editing draft.

In an alternative implementation, the first determining sub-module comprises:

an extracting sub-module configured to extract feature labels for the first text information and the at least one multimedia material respectively; and a first matching sub-module configured to obtain the at least one video editing template based on matching the feature labels for the first text information and the at least one multimedia material with an available video editing template, the at least one video editing template comprising a first video editing template that matches the feature label for the first text information and a second video editing template that matches the feature label for the at least one multimedia material.

In an alternative implementation, the second obtaining module comprises:

a second matching sub-module configured to determine a matching first multimedia material from the at least one multimedia material from a user material set, based on an analysis result for the first text information; and/or, a fourth generating sub-module configured to generate a second multimedia material from the at least one multimedia material based on the analysis result for the first text information, wherein the at least one multimedia material meets the video effect requirement described in the first text information.

In an alternative implementation, the apparatus further comprises:

a first display module configured to display a text input box, in response to an importing operation for the at least one multimedia material; and wherein the first obtaining module specifically configured to:

receive first text information based on the text input box.

In an alternative implementation, the apparatus further comprises:

a second displaying module configured to display at least one video label, wherein the video label is used to characterize the video effect; and wherein the first obtaining module specifically configured to:

obtain the first text information based on an operation of adding a target video label in the at least one video labels to the text input box.

In an alternative implementation, the apparatus further comprises:

a third display module configured to select a third video editing template from the at least one video editing template and presenting the third video editing template on a preview page for a video editing effect, so that the preview page is used to preview the video effect obtained by importing the at least one multimedia material into the third video editing template, and the preview page being configured with an update recommendation control; and a first replacing module configured to, in response to a trigger operation for the update recommendation control, select a fourth video editing template in the at least one video editing template, and replace the third video editing template presented on the preview page with the fourth video editing template, so that the preview page is used to preview the video effect obtained by importing the at least one multimedia material into the fourth video editing template.

In an alternative implementation, the apparatus further comprises:

a fourth displaying module configured to display, on a preview page, a fifth video editing template in the at least one video editing template;

a first adjusting module configured to obtain adjusted text information, in response to a text adjustment operation on the preview page for the first text information;

a first determining module configured to determine a second video editing template set based on the adjusted text information and the at least one multimedia material; and a second replacing module configured to replace the fifth video editing template displayed on the preview page with a sixth video editing template in the second video editing template set.

In an alternative implementation, the apparatus further comprises:

a second adjusting module configured to receive a material adjustment operation for the at least one multimedia material to obtain an adjusted multimedia material; and wherein the first determining module specifically configured to:

determine the second video editing template set based on the adjusted text information and the adjusted multimedia material.

In the apparatus for video generation provided in the embodiments of the present disclosure, the first text information used to describe a video effect requirement is obtained, and at least one multimedia material is obtained; a target video is generated based on the first text information and the at least one multimedia material; the at least one multimedia material is presented in the target video, a video effect of the target video meets the video effect requirement described in the first text information, the target video is used to present a combination of at least one video segment, the at least one video segment is formed respectively based on respective video-image materials in the at least one multimedia material, and the respective video-image materials comprise a video material and/or an image material. It may be seen that, in the embodiments of the present disclosure, the target video that meets the video effect requirement described in the first text information may be generated based on the obtained first text information and multimedia material, enriching the video generation manner and improving the user experience.

In addition to the method and apparatus described above, the embodiments of the present disclosure further provide a computer-readable storage medium, the computer-readable storage medium stores an instruction that, when executed on a terminal device, causes the terminal device to implement the method of video generation of the embodiments of the present disclosure.

The embodiments of the present disclosure also provide a computer program product. The computer program product comprises a computer program/an instruction, and the computer program/the instruction, when executed by a processor, implements the method of video generation of the embodiments of the present disclosure.

Figure 8:
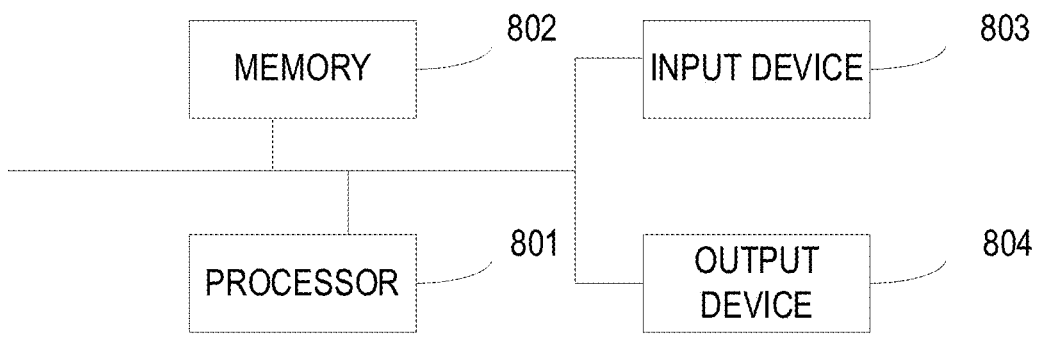
FIG. 8 is a schematic structural diagram of a device for video generation provided in the embodiments of the present disclosure.

Further, the embodiments of the present disclosure further provide a device for video generation, as shown in FIG. 8, the device may comprise:

a processor 801, a memory 802, an input device 803, and an output device 804. The number of processors 801 in the device for video generation may be one or more, and one processor is used as an example in FIG. 8. In some embodiments of the present disclosure, the processor 801, the memory 802, the input device 803, and the output device 804 may be connected via a bus or other means, and a connection via the bus is used as an example in FIG. 8.

The memory 802 may be used to store a software program and a module, and the processor 801 executes various functional applications and data processing of the device for video generation by running the software program and the module stored in the memory 802. The memory 802 may mainly include a storage program area and a storage data area, where the storage program area may store an operating system, an application program required for at least one function, or the like. In addition, the memory 802 may include a high-speed random access memory, and may further include a non-volatile memory, such as at least one disk storage device, flash memory device, or other volatile solid-state storage device. The input device 803 may be used to receive input digital or character information and generate a signal input related to a user setting and functional control of the device for video generation.

Specifically, in the embodiments of the present disclosure, the processor 801 may load an executable file corresponding to an process of one or more applications into the memory 802 according to the following instruction, and the application stored in the memory 802 is executed by the processor 801, thereby achieving various functions of the device for video generation mentioned above.

It should be noted that in this article, relational terms such as "first" and "second" are only used to distinguish one entity or operation from another entity or operation, and do not necessarily require or imply any actual relationship or order between these entities or operations. Moreover, the terms "comprising", "including", or any other variation thereof are intended to encompass non-exclusive inclusion, such that a process, a method, an item, or a device that includes a series of elements not only includes those elements, but also other elements that are not explicitly listed, or also include elements inherent in such a process, a method, an item, or a device. Without further limitations, the element limited by the statement "including one . . . " do not exclude the existence of other identical elements in the process, the method, the item, or the device that includes the said elements.

The above is only the specific implementation method of the present disclosure, which enables those skilled in the art to understand or implement this disclosure. Various modifications to these embodiments will be apparent to those skilled in the art, and the general principles defined in this article may be implemented in other embodiments without departing from the spirit or scope of the present disclosure. Therefore, this disclosure will not be limited to the embodiments described herein, but rather to the widest scope consistent with the principles and novel features disclosed herein.

We claim:

1. A method of video generation, comprising:
   displaying an interface configured to display a plurality of multimedia materials and to enable a selection of at least one multimedia material from the plurality of multimedia materials;
   in response to selecting at least two multimedia materials, displaying an input box on the same interface via which the at least two multimedia materials are selected, wherein the input box is configured to receive text information indicating a requirement to be met by a target video to be generated;
   extracting a feature label from the requirement indicated by first text information received via the input box;
   comparing the feature label of the first text information with templates in a template library and determining a first video editing template that matches the feature label of the first text information;
   extracting feature labels from the at least two multimedia materials;
   comparing the feature labels of the at least two multimedia materials with the templates in the template library and determining a second video editing template that matches the feature labels of the at least two multimedia materials;
   displaying the first video editing template and the second video editing template on a preview page;
   generating a new video editing template based on the first video editing template and the second video editing template; and
   generating the target video based on the new video editing template, the first text information received via the input box, and the at least two multimedia materials, wherein the target video is a new video, wherein the target video meets the requirement indicated by the first text information, the target video presents a combination of at least one video segment, the at least one video segment is formed respectively based on respective video-image materials in the at least two multimedia materials, and the respective video-image materials comprise at least one of video materials or image materials.

2. The method of claim 1, wherein the generating the target video comprises:
   generating a video editing draft based on the first text information and the at least two multimedia materials, wherein the video editing draft comprises the at least two multimedia materials and editing information, the editing information is used to indicate an editing operation for the at least two multimedia materials, and the editing operation is at least used to edit the respective video-image materials in the at least two multimedia materials respectively into the at least one video segment, a video editing effect and/or the at least one multimedia material corresponding to the editing operation meet the video effect requirement described in the first text information; and
   generating the target video based on the video editing draft.

3. The method of claim 2, wherein the generating a video editing draft based on the first text information and the at least two multimedia materials comprises:
   determining at least one video editing template based on the first text information and the at least two multimedia materials, wherein the editing effect of the at least one video editing template meets the video effect requirement described in the first text information; and
   applying an editing operation indicated by a target video editing template from the at least one video editing template to the at least two multimedia materials, to generate the video editing draft.

4. The method of claim 3, wherein after the determining at least one video editing template based on the first text information and the at least two multimedia materials, and the method further comprises:
   selecting a third video editing template from the at least one video editing template and presenting the third video editing template on a preview page for a video editing effect, so that the preview page is used to preview the video effect obtained by importing the at least one multimedia material into the third video editing template, and the preview page being configured with an update recommendation control; and in response to a trigger operation for the update recommendation control, selecting a fourth video editing template in the at least one video editing template, and replacing the third video editing template presented on the preview page with the fourth video editing template, so that the preview page is used to preview the video effect obtained by importing the at least one multimedia material into the fourth video editing template.

5. The method of claim 3, wherein after the determining at least one video editing template based on the first text information and the two multimedia materials, the method further comprises:

displaying, on a preview page, a fifth video editing template in the at least one video editing template;

obtaining adjusted text information, in response to a text adjustment operation on the preview page for the first text information;

determining a second video editing template set based on the adjusted text information and the at least one multimedia material; and replacing the fifth video editing template displayed on the preview page with a sixth video editing template in the second video editing template set.

6. The method of claim 5, wherein before the determining a second video editing template set based on the adjusted text information and the at least one multimedia material, the method further comprises:

receiving a material adjustment operation for the at least one multimedia material to obtain an adjusted multimedia material; and wherein the determining a second video editing template set based on the adjusted text information and the at least one multimedia material comprises determining the second video editing template set based on the adjusted text information and the adjusted multimedia material.

7. The method of claim 1, wherein obtaining the at least two multimedia materials comprises:

determining a matching first multimedia material from a user material set based on an analysis result for the first text information; or generating a second multimedia material based on the analysis result for the first text information.

8. The method of claim 1, wherein the method further comprises:

displaying the input box in response to an importing operation for the at least two multimedia materials.

9. The method of claim 1, wherein the method further comprises:

displaying at least one video label, wherein the video label is configured to characterize the requirement of the target video to be generated; and obtaining the first text information based on an operation of adding a target video label in the at least one video label to the input box.

10. A non-transitory computer-readable storage medium, wherein the computer-readable storage medium stores an instruction that, when executed on a terminal device, causes the terminal device to implement operations comprising:

displaying an interface configured to display a plurality of multimedia materials and to enable a selection of at least one multimedia material from the plurality of multimedia materials;

in response to selecting at least two multimedia materials, displaying an input box on the same interface via which the at least two multimedia materials are selected, wherein the input box is configured to receive text information indicating a requirement to be met by a target video to be generated;

extracting a feature label from the requirement indicated by first text information received via the input box;

comparing the feature label of the first text information with templates in a template library and determining a first video editing template that matches the feature label of the first text information;

extracting feature labels from the at least two multimedia materials;

comparing the feature labels of the at least two multimedia materials with the templates in the template library and determining a second video editing template that matches the feature labels of the at least two multimedia materials;

displaying the first video editing template and the second video editing template on a preview page;

generating a new video editing template based on the first video editing template and the second video editing template; and generating the target video based on the new video editing template, the first text information received via the input box, and the at least two multimedia materials, wherein the target video is a new video, wherein the target video meets the requirement indicated by the first text information, the target video presents a combination of at least one video segment, the at least one video segment is formed respectively based on respective video-image materials in the at least two multimedia materials, and the respective video-image materials comprise at least one of video materials or image materials.

11. The non-transitory computer-readable storage medium of claim 10, wherein the generating the target video comprises:

generating a video editing draft based on the first text information and the at least two multimedia materials, wherein the video editing draft comprises the at least two multimedia materials and editing information, the editing information is used to indicate an editing operation for the at least two multimedia materials, and the editing operation is at least used to edit the respective video-image materials in the at least two multimedia materials respectively into the at least one video segment, a video editing effect and/or the at least one multimedia material corresponding to the editing operation meet the video effect requirement described in the first text information; and generating the target video based on the video editing draft.

12. The non-transitory computer-readable storage medium of claim 11, wherein the generating a video editing draft based on the first text information and the at least two multimedia materials comprises:

determining at least one video editing template based on the first text information and the at least two multimedia materials, wherein the editing effect of the at least one video editing template meets the video effect requirement described in the first text information; and applying an editing operation indicated by a target video editing template from the at least one video editing template to the at least two multimedia materials, to generate the video editing draft.

13. The non-transitory computer-readable storage medium of claim 12, wherein after the determining at least one video editing template based on the first text information and the at least two multimedia materials, and the operations further comprise:
    selecting a third video editing template from the at least one video editing template and presenting the third video editing template on a preview page for a video editing effect, so that the preview page is used to preview the video effect obtained by importing the at least one multimedia material into the third video editing template, and the preview page being configured with an update recommendation control; and
    in response to a trigger operation for the update recommendation control, selecting a fourth video editing template in the at least one video editing template, and replacing the third video editing template presented on the preview page with the fourth video editing template, so that the preview page is used to preview the video effect obtained by importing the at least one multimedia material into the fourth video editing template.

14. The non-transitory computer-readable storage medium of claim 12, wherein after the determining at least one video editing template based on the first text information and the at least two multimedia materials, the operations further comprise:
    displaying, on a preview page, a fifth video editing template in the at least one video editing template;
    obtaining adjusted text information, in response to a text adjustment operation on the preview page for the first text information;
    determining a second video editing template set based on the adjusted text information and the at least one multimedia material; and
    replacing the fifth video editing template displayed on the preview page with a sixth video editing template in the second video editing template set.

15. The non-transitory computer-readable storage medium of claim 10, wherein obtaining the at least two multimedia materials comprises:
    determining a matching first multimedia material from a user material set based on an analysis result for the first text information; or
    generating a second multimedia material based on the analysis result for the first text information.

16. The non-transitory computer-readable storage medium of claim 10, wherein the operations further comprise:
    displaying the input box in response to an importing operation for the at least two multimedia materials.

17. The non-transitory computer-readable storage medium of claim 10, wherein the operations further comprise:
    displaying at least one video label, wherein the video label is configured to characterize the requirement of the target video to be generated; and
    obtaining the first text information based on an operation of adding a target video label in the at least one video label to the input box.

18. A device for video processing, comprising: a memory, a processor, and a computer program stored in the memory and executable on the processor, the computer program, when executed by the processor, implement operations comprising:
    displaying an interface configured to display a plurality of multimedia materials and to enable a selection of at least one multimedia material from the plurality of multimedia materials;
    in response to selecting at least two multimedia materials, displaying an input box on the same interface via which the at least two multimedia materials are selected, wherein the input box is configured to receive text information indicating a requirement to be met by a target video to be generated;
    extracting a feature label from the requirement indicated by first text information received via the input box;
    comparing the feature label of the first text information with templates in a template library and determining a first video editing template that matches the feature label of the first text information;
    extracting feature labels from the at least two multimedia materials;
    comparing the feature labels of the at least two multimedia materials with the templates in the template library and determining a second video editing template that matches the feature labels of the at least two multimedia materials;
    displaying the first video editing template and the second video editing template on a preview page;
    generating a new video editing template based on the first video editing template and the second video editing template; and
    generating the target video based on the new video editing template, the first text information received via the input box, and the at least two multimedia materials, wherein the target video is a new video, wherein the target video meets the requirement indicated by the first text information, the target video presents a combination of at least one video segment, the at least one video segment is formed respectively based on respective video-image materials in the at least two multimedia materials, and the respective video-image materials comprise at least one of video materials or image materials.

19. The device of claim 18, the operations further comprising:
    displaying at least one video label, wherein the video label is configured to characterize the requirement of the target video to be generated; and
    obtaining the first text information based on an operation of adding a target video label in the at least one video label to the input box.

20. The device of claim 18, the operations further comprising:
    displaying the new video editing template on a preview page, wherein the preview page is configured to enable a preview of the target video by importing the at least two multimedia materials into a video editing template.

* * * * *